United States Patent [19]
Geiger

[11] Patent Number: 5,645,369
[45] Date of Patent: Jul. 8, 1997

[54] PLATE-SHAPED PAVING STONE, IN PARTICULAR MADE OF CONCRETE

[76] Inventor: Peter Geiger, Regensburger Str. 160, D-92318 Neumarkt, Germany

[21] Appl. No.: 501,084

[22] PCT Filed: Dec. 3, 1994

[86] PCT No.: PCT/EP94/04028

§ 371 Date: Aug. 2, 1995

§ 102(e) Date: Aug. 2, 1995

[87] PCT Pub. No.: WO95/16076

PCT Pub. Date: Jun. 15, 1995

[30] Foreign Application Priority Data

Dec. 8, 1993 [EP] European Pat. Off. ............. 93119745

[51] Int. Cl.⁶ ................................................... E01C 5/00
[52] U.S. Cl. ............................ 404/34; 404/42; 52/311.1; 52/601
[58] Field of Search .................. 404/34, 37, 38, 404/41, 42; 52/311.1, 311.2, 603, 604, 605, 608, 609, 314, 607

[56] References Cited

U.S. PATENT DOCUMENTS

| 1,379,440 | 5/1921 | Brainerd | 404/34 |
| 3,903,702 | 9/1975 | Appleton | 61/37 |

FOREIGN PATENT DOCUMENTS

| 1885530 | 1/1964 | Germany . |
| 7912656 | 5/1979 | Germany . |
| 8707649 | 7/1987 | Germany . |
| 8717484 | 12/1988 | Germany . |
| 9111552 | 11/1991 | Germany . |
| 65126 | 4/1984 | Japan ................................. 52/607 |

OTHER PUBLICATIONS

Betonwerk + Fertigteil Technik, vol. 50, No. 3, 1984, p. 164.

Primary Examiner—Henry A. Bennett
Assistant Examiner—Pamela A. O'Connor
Attorney, Agent, or Firm—Collard & Roe, P.C.

[57] ABSTRACT

A paving stone, in particular made of concrete, is utilized to produce a stable, highly water-permeable flooring. The paving stones are provided with two opposed side surfaces and two opposed end surfaces, each side and end surface having a trapezoidal recess formed therein; and further, each recess of each side surface is bordered by a bordering surface having an additional recess formed therein.

5 Claims, 1 Drawing Sheet

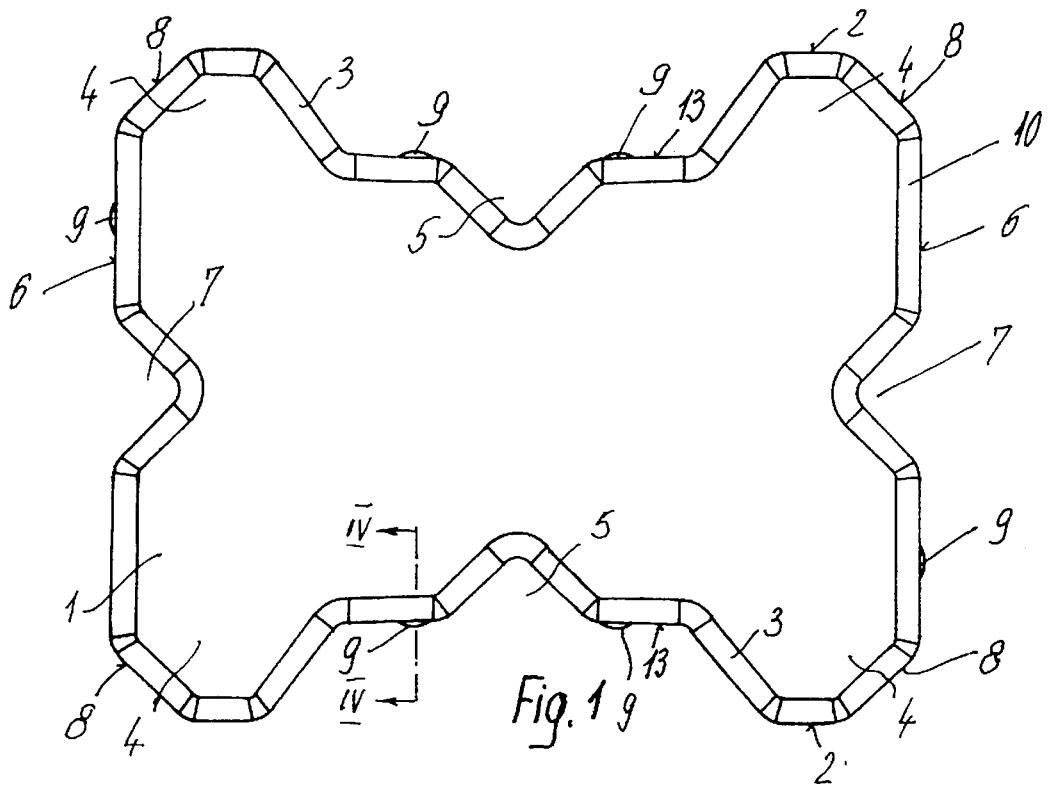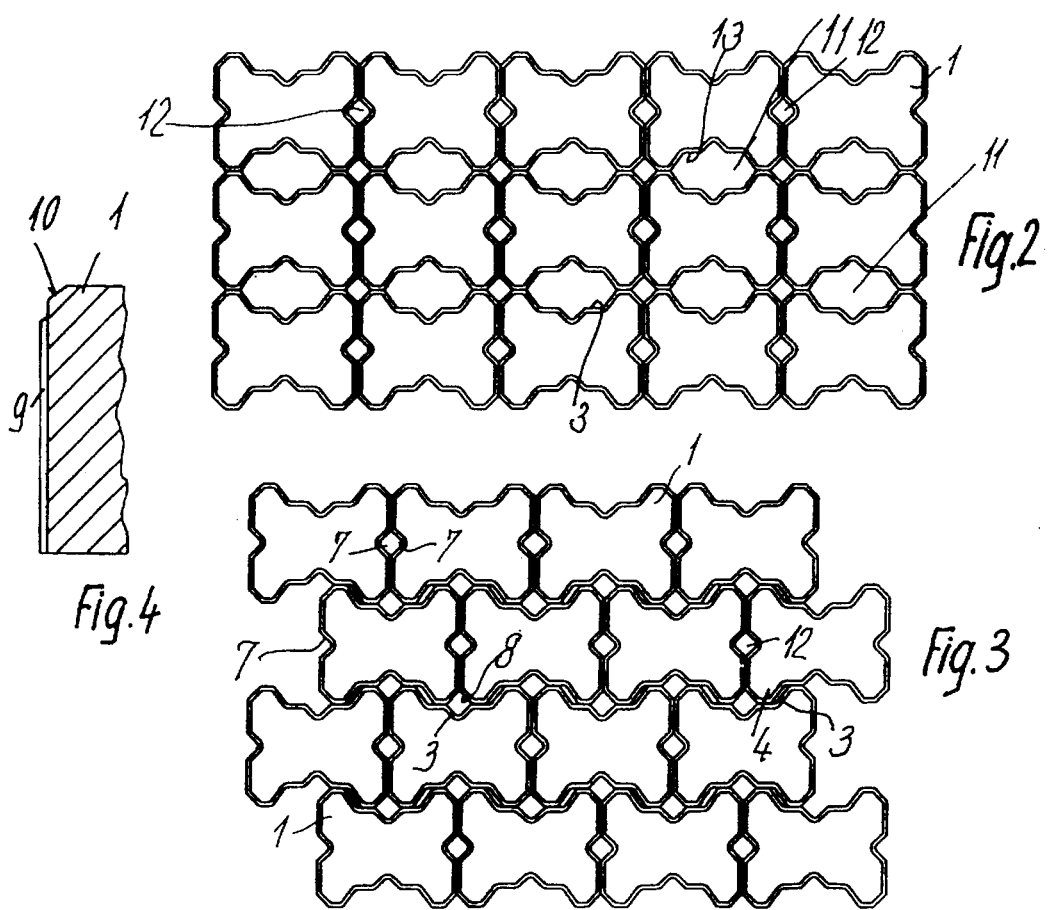

PLATE-SHAPED PAVING STONE, IN PARTICULAR MADE OF CONCRETE

The invention relates to a plate-shaped paving stone, in particular made of concrete, with lateral surfaces with respect to the vertical.

Plate-shaped paving stones provided with ridges on the lateral surfaces are known (Gm 87 17 484). The ridges have the purpose to form joints between neighboring concrete stones during the laying of the concrete stones to permit precipitation water to drain off into the subsoil. However, it has been shown that the ridges permit tipping of the concrete stones under heavy loads, such as vehicles driving over them, for example, resulting in an instable pavement, the extent of the instability depending on the horizontal length of the ridges.

It is the purpose of the invention to provide a concrete stone forming a stable pavement with high permeability.

This problem is solved according to the invention in that recesses with essentially trapezoid cross sections are formed in two opposite lateral surfaces of the paving stone, that the bordering surfaces facing each other of the trapezoid recesses have another recess in the central areas, that recesses are formed in the center of the lateral surfaces extending transversely to the lateral surfaces of the paving stone, and that slants are arranged in the corner areas of neighboring lateral surfaces of the paving stone. The concrete stone so formed allows in the paving pattern direct and tipping-free support on neighboring concrete stones of the same type and the formation of bordered openings for unhindered drainage of water. Depending on the paving pattern, i.e. running bond or cross bond, openings of different size may be formed allowing for an adaptation of the desired permeability. It is understood that especially when laying in cross bond, the large diameters for the openings formed in the paving stone may be used as lawn-type pavement when the openings are filled with soil.

The design of the paving stone provides for trapezoid recesses having preferably cross sections of the same size. Furthermore, it is provided that the recesses in the bordering surfaces of the trapezoid recesses and the recesses arranged in the center of the lateral surfaces have an essentially triangular cross section. It is understood that changes are possible with respect to the shape and size of the cross sections. For example, it is possible to provide the openings formed in the trapezoid recesses and in the lateral surfaces with a square or rectangular cross section. The use of semicircular recesses for the openings is also conceivable.

If only small distances are desired between the neighboring paving stones, especially the lateral surfaces in diagonal sections and the bordering surfaces of the trapezoid recesses may have vertical spacer strips on both sides next to the recesses. It is understood that the horizontal length of the spacer strips is appropriately small.

Finally, the paving stone is provided on its top side, inclined from the top and continuously along the lateral sides, with small-sized chamfers (phases).

BRIEF DESCRIPTION OF THE DRAWINGS

An example of an embodiment of the invention is illustrated in the drawing, wherein:

FIG. 1 shows a paving stone in top view;

FIG. 2 shows paving stones in cross bond;

FIG. 3 shows paving stones in running bond; and

FIG. 4 shows a section along the line IV—IV of FIG. 1.

The basic shape of paving stone 1 is essentially rectangular. Recesses 3 with an essentially trapezoid cross section are formed in the two opposite longitudinal sides 2 of paving stone 1. Recesses 3 form hump-like sections 4 and extend substantially in the central part over part of the length of the longitudinal sides. Further recesses 5 follow the trapezoid recesses 3 in the area of the bordering surfaces 13 facing each other. In the example, said recesses have a triangular cross section. Further recesses 7, again with triangular cross sections, essentially of the same size cross sections as recesses 5, are formed in the center of the transverse sides 6. In addition, paving stone 1 is provided in the corners with slants 8 and spacer strips 9. Spacer strips 9 are arranged in the areas bordering the trapezoid recesses 3 facing each other next to recesses 5 or in the diagonal areas of the transversal sides 6. Spacer strips 9 have little horizontal length so that only narrow joints are formed when the paving stones of the proposed type are joined together. Finally, the top side of paving stone 1 is provided with low-height chamfers 10 running continuously around paving stone 1 inclined from the top to the lateral surfaces. Chamfers 10 form phases in the paving bond of paving stone 1 which prevent interfering projections at the top side.

FIG. 2 shows paving stone 1 in cross bonding. For this type of bond, the paving stones are positioned to permit direct contact of the hump-like sections of adjacent stones. Trapezoid recesses 3 form openings 11 which are relatively large for cross bonding, while recesses 7 in transversal sides 6 or slants 8 form further openings 12 having smaller diameters. Cross bonding generally has the advantage of forming relatively large openings 11, 12, permitting water or the like to drain fast and easily into the subsoil. Furthermore, openings 11, 12 permit filling with soil so that paving stone 1 may be used as a lawn-type pavement having great water permeability and being a safe support.

FIG. 3 shows paving stones in running bond. At this type of paving, hump-like sections 4 reach into trapezoid recesses 3, thus closely interlocking neighboring paving stones 1. This bonding type is especially suitable to support heavy loads. In addition, recesses 7 formed in the transversal sides 6 of neighboring paving stones form openings 12 with each other and recesses 3 with slants 8 form other openings 12, together ensuring safe drainage of water or the like.

I claim:

1. A concrete paving stone formed from a block having four vertical side surfaces and a top surface, comprising:

two opposed side surfaces, each side surface having a trapezoidal recess formed therein bordered by a bordering surface, each bordering surface having an additional recess formed therein;

two opposed end surfaces extending transversely between said two opposed side surfaces, each end surface having a further recess formed therein; and four corner surfaces, each corner surface located adjacent to a side surface and being oriented obliquely thereto.

2. The concrete paving stone of claim 1, wherein the trapezoid recesses are of the same size.

3. The concrete paving stone of claim 1, wherein the additional recesses and the further recesses are of triangular shape and the same size.

4. The concrete paving stone of claim 1, further comprising a plurality of vertically-extending spacer strips, one spacer strip is located on each side of the additional recess.

5. The concrete paving stone of claim 1, further comprising a continuous chamfer extending completely around the top surface and inclined downwardly toward said side surfaces.

* * * * *